(12) United States Patent
Kumar

(10) Patent No.: US 8,943,884 B2
(45) Date of Patent: Feb. 3, 2015

(54) SMART SEALS AND OTHER ELASTOMER SYSTEMS FOR HEALTH AND PRESSURE MONITORING

(75) Inventor: Sunil Kumar, Celle (DE)

(73) Assignee: Baker Hughes Incorporated, Houston, TX (US)

( * ) Notice: Subject to any disclaimer, the term of this patent is extended or adjusted under 35 U.S.C. 154(b) by 633 days.

(21) Appl. No.: 13/186,604

(22) Filed: Jul. 20, 2011

(65) Prior Publication Data

US 2012/0017674 A1  Jan. 26, 2012

Related U.S. Application Data

(60) Provisional application No. 61/366,606, filed on Jul. 22, 2010.

(51) Int. Cl.
*E21B 44/00* (2006.01)
*B82Y 30/00* (2011.01)
*E21B 47/01* (2012.01)
*G01M 3/16* (2006.01)

(52) U.S. Cl.
CPC ............... *B82Y 30/00* (2013.01); *E21B 47/011* (2013.01); *G01M 3/16* (2013.01)
USPC ...................................................... 73/152.48

(58) Field of Classification Search
CPC ... E21B 33/10; E21B 47/011; E21B 33/1216; E21B 10/25; Y10S 310/80; H01L 41/0478
USPC ............ 73/152.54, 152.26, 152.48; 166/84.1, 166/88.3

See application file for complete search history.

(56) References Cited

U.S. PATENT DOCUMENTS

| | | | |
|---|---|---|---|
| 3,934,219 A | 1/1976 | Monaghan | 367/191 |
| 4,262,284 A | 4/1981 | Stieff et al. | 340/541 |
| 7,665,355 B2 * | 2/2010 | Zhang et al. | 73/152.48 |
| 7,696,275 B2 * | 4/2010 | Slay et al. | 524/496 |
| 8,448,949 B2 * | 5/2013 | Stewart et al. | 277/317 |
| 8,593,034 B2 * | 11/2013 | Liu et al. | 310/328 |
| 2004/0060696 A1 | 4/2004 | Schultz et al. | |
| 2004/0194970 A1* | 10/2004 | Eatwell et al. | 166/387 |
| 2004/0263028 A1* | 12/2004 | Pei et al. | 310/800 |
| 2007/0151724 A1 | 7/2007 | Ohmer et al. | |
| 2007/0172371 A1 | 7/2007 | Podmore | |
| 2008/0121436 A1 | 5/2008 | Slay et al. | |
| 2008/0236271 A1* | 10/2008 | Zhang et al. | 73/152.48 |
| 2008/0261044 A1* | 10/2008 | Lalli et al. | 428/402 |
| 2009/0139710 A1 | 6/2009 | Robisson et al. | |

(Continued)

OTHER PUBLICATIONS

Notification of Transmittal of the International Search Report and the Written Opinion of the International Searching Authority, or the Declaration; PCT/US2011/044852; Mar. 28, 2012.

(Continued)

*Primary Examiner* — John Fitzgerald
(74) *Attorney, Agent, or Firm* — Cantor Colburn LLP

(57) ABSTRACT

Disclosed is an apparatus for monitoring a material configured to perform one or more functions or for actuating the material. One or more electrodes are coupled to the material. An electronic device is coupled to the one or more electrodes and is configured to detect an electrical characteristic of the material to monitor the material or to apply an electrical stimulus to actuate the material.

31 Claims, 8 Drawing Sheets

(56) References Cited

U.S. PATENT DOCUMENTS

| | | | |
|---|---|---|---|
| 2010/0018778 A1* | 1/2010 | Nanayakkara | 175/371 |
| 2011/0266927 A1* | 11/2011 | Liu et al. | 310/367 |
| 2012/0119448 A1* | 5/2012 | Stewart et al. | 277/650 |
| 2012/0267858 A1* | 10/2012 | Rust | 277/321 |
| 2013/0019374 A1* | 1/2013 | Schwartz | 2/69 |

OTHER PUBLICATIONS

Campion, R.P., Elastomers for Fluid Containment in Offshore Oil and Gas Production: Guidelines and Review, Book, 2005, 63 pages, vol. 320, HSE Books, USA.

* cited by examiner

SMART SEALS AND OTHER ELASTOMER SYSTEMS FOR HEALTH AND PRESSURE MONITORING

CROSS REFERENCE TO RELATED APPLICATIONS

This application claims the benefit of an earlier filing date from U.S. Provisional Application Ser. No. 61/366,606 filed Jul. 22, 2010, the entire disclosure of which is incorporated herein by reference.

BACKGROUND

1. Field of the Invention

The invention disclosed herein relates to elastomer systems and, in particular, to elastomer systems used as seals in a downhole environment.

2. Description of the Related Art

Boreholes are drilled deep into the earth for many applications such as carbon sequestration, geothermal production, and hydrocarbon exploration and production. Many different types of tools and instruments may be disposed in the boreholes to perform various tasks. Typically, very high pressures are encountered by the tools and instruments when they are disposed deep into the earth.

Seals are used to isolate internal components from the high pressures external to the tools and instruments. It is important for the seals to function properly in the downhole environment because the internal components can be damaged or fail if exposed to the high pressure. It can be very expensive in time and equipment if the internal components fail because the failed components will have to be extracted from the borehole, replaced, and then sent down the borehole. It would be well received in the drilling industry if the sealing art could be improved.

BRIEF SUMMARY

Disclosed is an apparatus that includes: an electrode configured to be coupled to a material; and an electronic device coupled to the electrode and configured to detect an electrical characteristic of the material to monitor the material or to apply an electrical stimulus to the material to actuate the material.

Also disclosed is a method for monitoring a material or actuating the material, the method includes: coupling an electrode to the material; and detecting an electrical characteristic of the material using an electronic device coupled to the electrode to monitor the material or applying an electrical stimulus to the material using the electronic device to actuate the material.

Further disclosed is a non-transitory computer-readable medium having computer-executable instructions for monitoring a material by detecting an electrical characteristic of the material using an electronic device coupled to an electrode that is coupled to the material to monitor the material or by applying an electrical stimulus to the material using the electronic device to actuate the material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Figure 1:
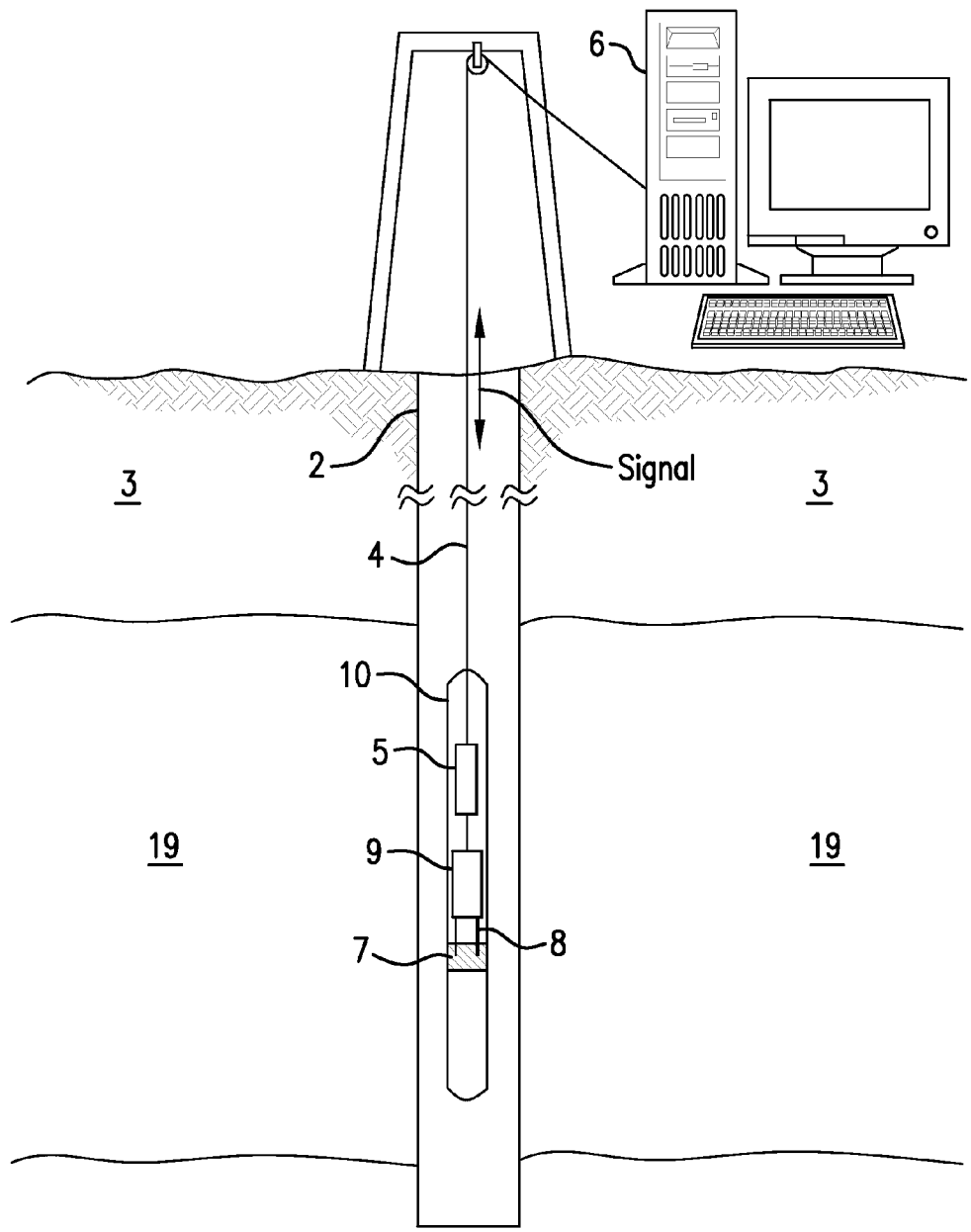
FIG. 1 illustrates an exemplary embodiment of a downhole tool disposed in a borehole penetrating the earth.

FIG. 1 illustrates an exemplary embodiment of a downhole tool 10 disposed in a borehole 2 penetrating the earth 3, which includes an earth formation 19. The downhole tool 10 is conveyed through the borehole 2 by a carrier 4. In the embodiment of FIG. 1, the carrier 4 is an armored wireline. Besides supporting the downhole tool 10 in the borehole 2, the wireline can also provide communications between the downhole tool and a computer processing system 6 disposed at the surface of the earth 3. In logging-while-drilling (LWD) or measurement-while-drilling (MWD) embodiments, the carrier 4 can be a drill string. In order to operate the downhole tool 10 and/or provide a communications interface with the surface computer processing system 6, the downhole tool 10 includes downhole electronics 5.

Still referring to FIG. 1, the downhole tool 10 includes an elastomer material 7. The elastomer material 7 can be configured to perform one or more functions for the downhole tool 10. Non-limiting examples of the functions include forming a pressure tight seal, providing cushioning and/or shock absorbing capability, and/or supporting various components as an adhesive. The term "elastomer system" is used to represent systems employing the elastomer material 7 for one or more functions. In order to monitor the elastomer material 7, one or more electrodes 8 are coupled to the elastomer material 7. Coupled to the one or more electrodes 8 is an electronic monitoring device 9. In other embodiments, the electronic monitoring device 9 can be included in the downhole electronics 5 and/or the surface computer processing system 6. The term "monitoring" as used herein relates to measuring performance (including environmental conditions) of the elastomer material 7 and/or detecting degradation of the elastomer material 7. Measuring performance and detecting degradation may be collectively referred to as monitoring the health of the elastomer material 7.

The elastomer material 7 is monitored by detecting an electrical characteristic of the elastomer material 7 or a change in the electrical characteristic of the elastomer material 7. The electrical characteristic is measured by sending and measuring an electrical signal through the elastomer material 7. For example, by applying a voltage to the elastomer material 7 and measuring the corresponding current (including magnitude and phase angle) flowing through the elastomer material 7, an impedance can be calculated. If the elastomer material 7 is conductive, then resistance and/or conductance may be calculated. If the elastomer material 7 is a dielectric, then capacitance may be calculated. Accordingly, the measured electrical characteristic depends on the electrical characteristic(s) exhibited by the elastomer material 7.

It can be appreciated that the elastomer material 7 can include any elastomer that exhibits an electrical characteristic that changes when a physical characteristic of the elastomer material 7 changes. The physical characteristic in one embodiment is a shape that can change due to expansion (i.e., stretching) or compression. The expansion or compression can be due to pressure changes or temperature changes.

The term "elastomer" relates to a polymer with the property of viscoelasticity. In general, elastomers have a low Young's modulus and a high yield strain as compared to other materials. As such, selected elastomers are relatively soft and deformable at desired temperatures.

The elastomer material may be fabricated to incorporate a selected electrical characteristic. For example, if a conductive property is desired, conductive nanoparticles and/or nanotubes can be mixed in with an elastomer to create the elastomer material 7. Non-limiting embodiments of materials used for the nanoparticles and/or the nanotubes include carbon, carbon black, and a conducting metal. In addition, conducting fillers, such as carbon black, may also be mixed with an elastomer to create the elastomer material 7. If a capacitive property is desired, then a high dielectric filler can be mixed with an elastomer to create the elastomer material 7. Fillers are generally liquids or powders, which may be dispersed or mixed evenly throughout an elastomer.

The techniques for monitoring the elastomer material 7 are now discussed using pressure experienced by the elastomer material 7 as an example of a physical environment experienced by the elastomer material 7. In one embodiment, the conductivity of the elastomer material 7 is proportional to the pressure that the elastomer material 7 is experiencing. A change in the conductivity can indicate a change in pressure that the elastomer material 7 is experiencing. Alternatively, comparing changes in the measured conductivity with changes in applied pressure can be used to determine deterioration of the elastomer material 7. For example, a sudden change or a gradual change in the measured conductivity when the applied pressure is constant can indicate the deterioration of the elastomer material 7. In one embodiment, the elastomer material 7 is used as a compression seal. Changes in the conductivity of the elastomer material 7 can indicate deterioration of the seal.

Figure 2A:
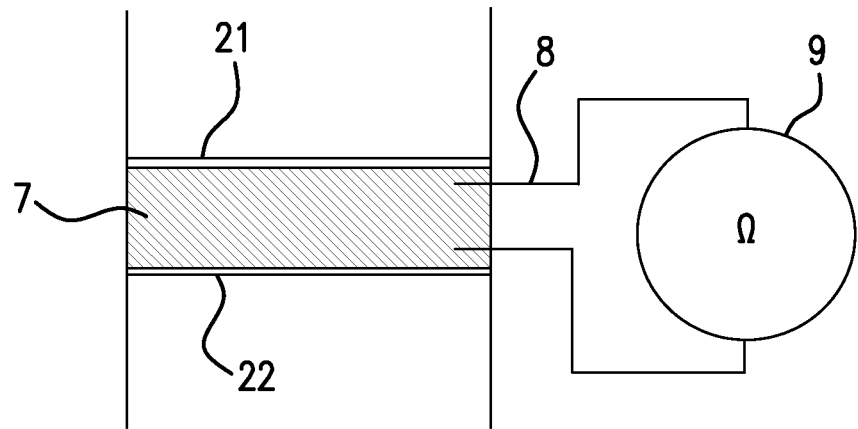
FIGS. 2A and 2B, collectively referred to as FIG. 2 depict aspects of monitoring a good seal and a degraded seal made of an elastomer material in the downhole tool.

Reference may now be had to FIG. 2, which depicts aspects of the elastomer material 7 used as a seal, which may be referred to as a "smart seal." FIG. 2A illustrates the elastomer material 7 forming a good seal between a first surface 21 and a second surface 22. In the embodiment of FIG. 2, the electronic monitoring device 9 is configured to measure the impedance of the elastomer material 7. In FIG. 2A, the electronic monitoring device 9 provides a first impedance measurement for the good seal. The first impedance measurement can be a constant impedance or the first impedance measurement can be a varying value that is related to environmental changes, such as pressure changes, experienced by the elastomer material 7. When the first impedance measurement is varying, environmental changes can be monitored to provide an indication that the varying measurement is to be expected to be within a range of values and is not an indication of a defective seal.

Figure 2B:
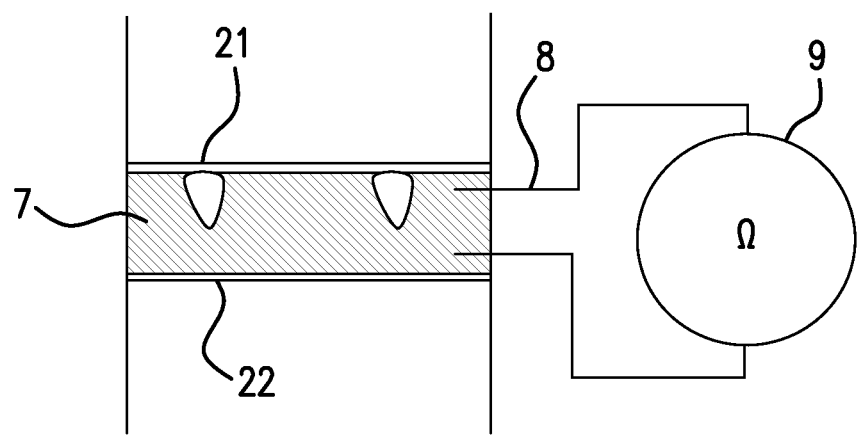

FIG. 2B illustrates the elastomer material 7 forming a defective or bad seal between the first surface 21 and the second surface 22. The electronic monitoring device 9 in FIG. 2B can provide a second impedance measurement that indicates a sudden change from the first impedance measurement of the elastomer material 7 to indicate that the elastomer material 7 now forms a defective seal. When the first impedance measurement is varying, the second impedance measurement can also be expected to vary. However, the varying second impedance measurement is outside of the range of values that indicate a good seal. In addition to identifying a defective seal, the techniques disclosed herein can also be used to identify a failing seal. The failing seal may provide adequate sealing but also provides a change in an electrical characteristic that indicates the seal may be deteriorating and about to fail. Gradual changes in the second impedance measurement most likely signify gradual deterioration such as a failing seal whereas significant sudden changes point towards cracks and significant deterioration of the elastomer material 7.

Figure 3:
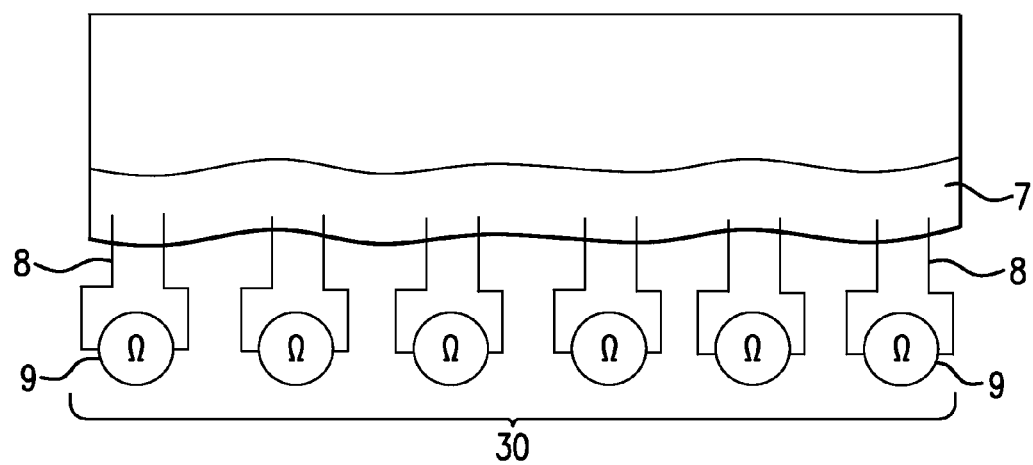
FIG. 3 depicts aspects of using a plurality of electrodes for monitoring a condition of a seal.

FIG. 3 illustrates an array 30 of the electrodes 8 coupled to the elastomer material 7 used in an elastomer system. The array 30 and the associated plurality of electronic monitoring devices 9 are configured to monitor a health of the elastomer material 7 used in the elastomer system. Non-limiting examples of the health include a pressure, temperature, abrasion, or fractive fatigue. The term "fractive fatigue" relates to a fatigue condition of the elastomer material 7 that can lead to fracturing or cracks in the elastomer material 7. In one embodiment, the electrodes 8 in the array 30 are disposed in a pattern configured to monitor substantially the whole elastomer material 7. It can be appreciated that increasing the number of the electrodes 8 in an area of the elastomer material 7 can result in an increase in the resolution in relating a measured electrical characteristic to a corresponding area of the elastomer material 7.

Figure 4:
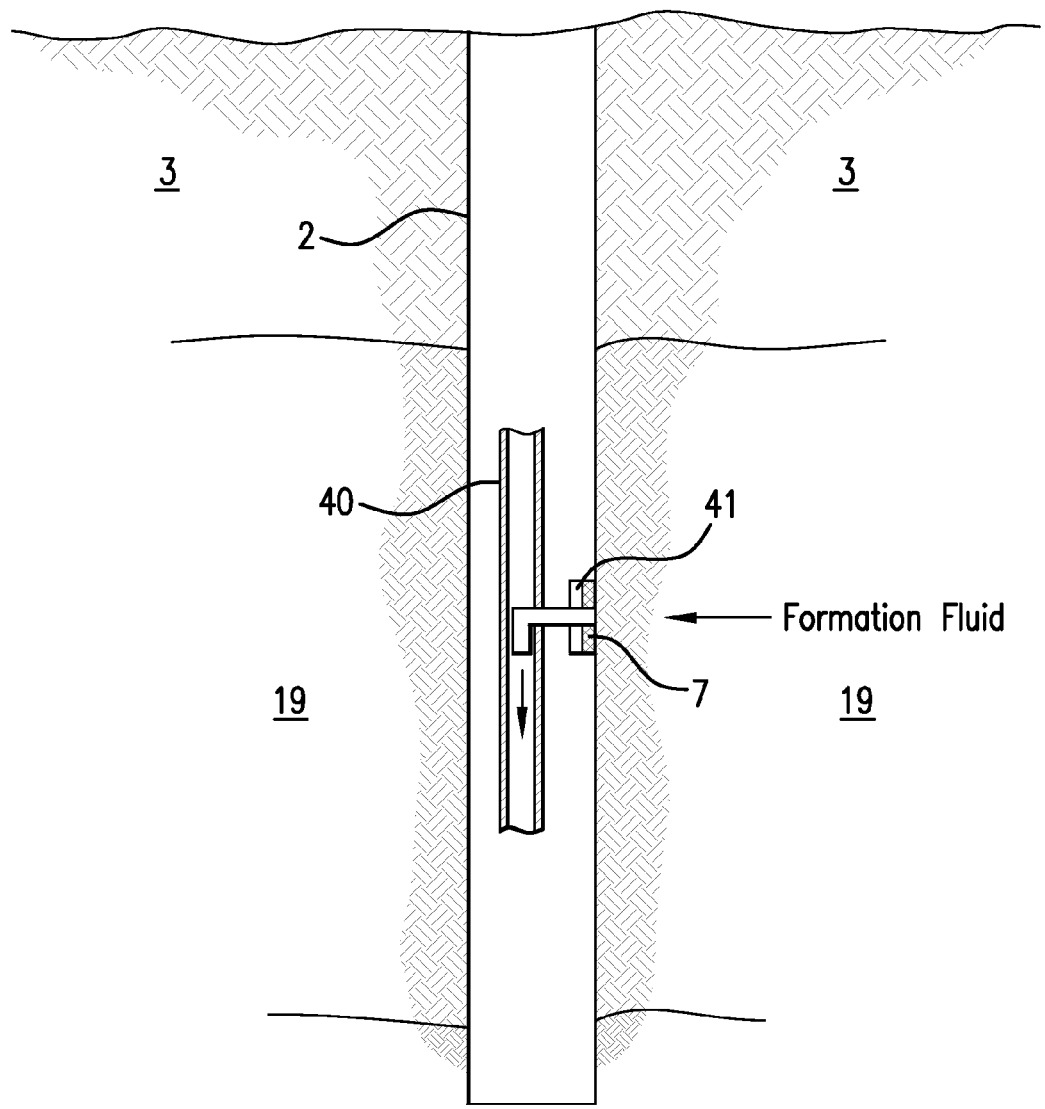
FIG. 4 illustrates an exemplary embodiment of a formation tester using an elastomer material to seal against a wall of the borehole.

The array 30 of the electrodes 8 can also be used to measure a pressure profile when the elastomer material 7 is pressing against a surface. The pressure profile in turn can be related to a surface profile of the surface, which can be used for measurement, control, or optimizing a load. In one embodiment, the surface is a wall of the borehole 2 and the elastomer material 7 is configured to seal against the wall. FIG. 4 illustrates an exemplary embodiment of a formation tester 40, which is one example of the downhole tool 10. The formation tester 40 includes a probe 41 configured to extend from the formation tester 40 and to seal against a wall of the borehole 2 using the elastomer material 7. Formation fluid in the formation 19 can be extracted into the formation tester 40 where one or more tests can be performed on the formation fluid. The array 30 of the electrodes 8 can measure a profile of the seal against the borehole wall. The integrity or health of the seal can be estimated from the profile. A leaky seal can allow borehole fluid to enter the formation tester 40 and contaminate the extracted formation fluid. Thus, by identifying a leaky seal, corrupted measurements can be prevented.

One advantage of the array 30 is that a health profile can be created over an area of the elastomer material 7 in the elastomer system. A known healthy profile can be created for the elastomer material 7 in a healthy elastomer system from modeling, simulation, and/or laboratory tests. A deviation from the healthy profile can indicate a local stress point in a particular area of the elastomer material 7. When the operating conditions are such that the measured impedance of the elastomer material 7 is normally expected to vary, these expected variations can be removed or subtracted to give the variations or changes due to the health of the elastomer material 7.

It can be appreciated that when used with a real time telemetry system such as wired drill pipe, the downhole monitoring device 9 can provide an operator or user with an indication of the health of the elastomer material 7 in real time. By receiving the indication in real time, the operator can alter drilling operations quickly enough to prevent damage to a drilling system when the indication indicates that the elastomer material 7 is failed or failing.

Figure 5:
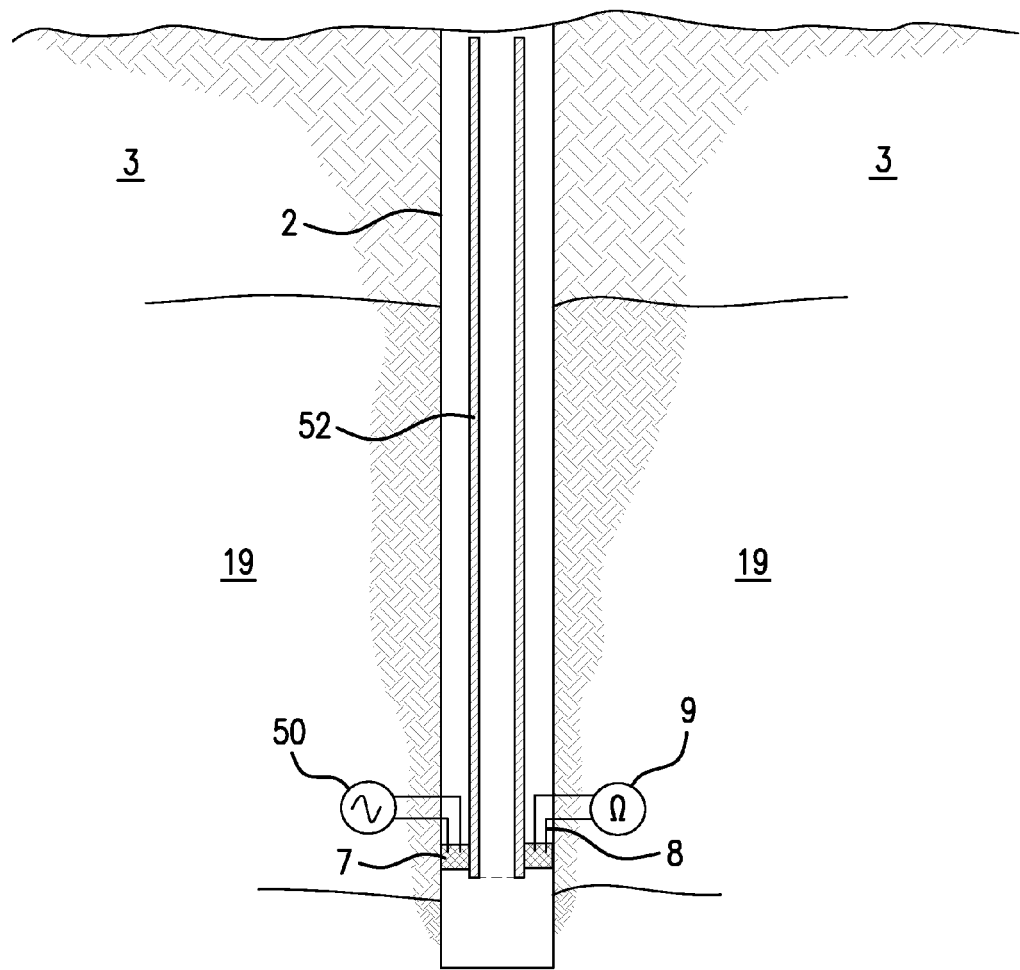
FIG. 5 depicts aspects of the elastomer material configured as a seal, plug or casing shoe.

As described above, the elastomer material 7 exhibits an electrical characteristic that can be monitored. Electrical properties of the elastomer material 7 can also cause the elastomer material 7 to respond to an electrical stimulus such as an applied voltage or current. Expansion, contraction, application of pressure, and change of shape are non-limiting examples of responses to the electrical stimulus. FIG. 5 illustrates various exemplary embodiments of the elastomer material 7 used downhole. The borehole 2 in FIG. 5 is lined with a casing 52 (which can also represent a tubular being sealed). In one embodiment, the elastomer material 7 is a seal or plug configured to isolate one portion of the borehole 2 from another portion of the borehole 2. The integrity of the elastomer material 7 configured as a seal or plug can be monitored using the electronic monitoring device 9 and the electrodes 8. The elastomer material 7 in another embodiment can be actuated (i.e., causing the elastomer material 7 to seal or causing the elastomer material 7 to unseal) using an electronic actuating device 50 configured to apply an electrical stimulus to the elastomer material 7 using the electrodes 8. Being able to actuate the elastomer material 7 also brings feedback capability to the seal to act on an external input such as an environmental input. A selected pressure profile can be applied by the elastomer material 7 in response to an electrical stimulus applied to each set of the electrodes 8 in the array 30. It can be appreciated that increasing the number of the electrodes 8 in the array 30 can result in a finer resolution of the applied pressure profile. The electronic actuating device 50 can be implemented independently or incorporated in other electronic devices such as the downhole electronics 5 or the electronic monitoring device 9. In general, the term "actuate" relates to the elastomer material 7 undergoing a physical change in response to an applied electrical stimulus.

Still referring to FIG. 5, in one embodiment, the elastomer material 7 is a casing shoe disposed around the distal end of the casing 52 and configured to guide the casing 52 through the borehole 2. The integrity of the elastomer material 7 configured as a casing shoe can be monitored using the electronic monitoring device 9 and the electrodes 8.

Figure 6:
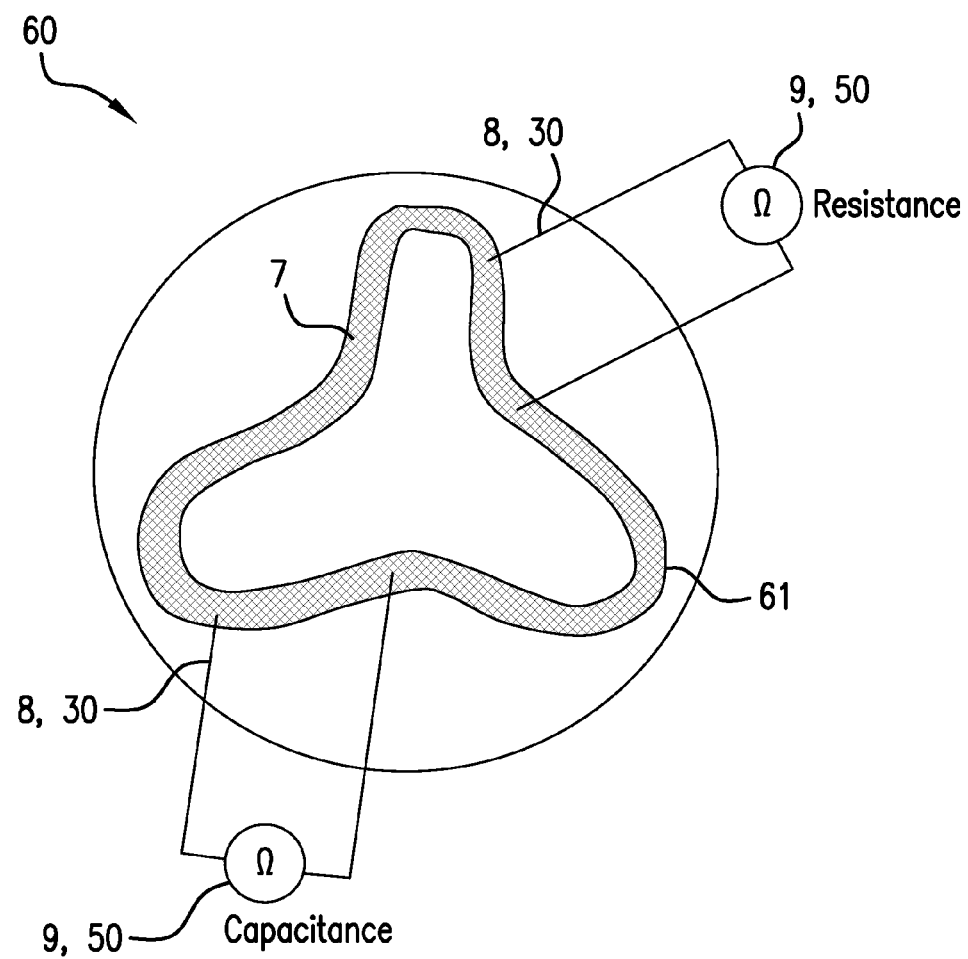
FIG. 6 depicts aspects of the elastomer material configured as a stator in a positive displacement motor.

Reference may now be had to FIG. 6 illustrating the elastomer material 7 being configured as a stator 61 in a positive displacement motor (PDM) 60 such as a mud motor or pump. The array 30 of the electrodes 8 embedded in the elastomer material 7 can give a complete pressure map for the stator 61. The pressure map can provide for optimizing the design of the PDM 60 and determining where erosion points may occur. In addition to or in lieu of monitoring, the stator 61 can be actuated using the array 30 to provide a selected pressure profile to improve performance of the PDM 60.

Figure 7:
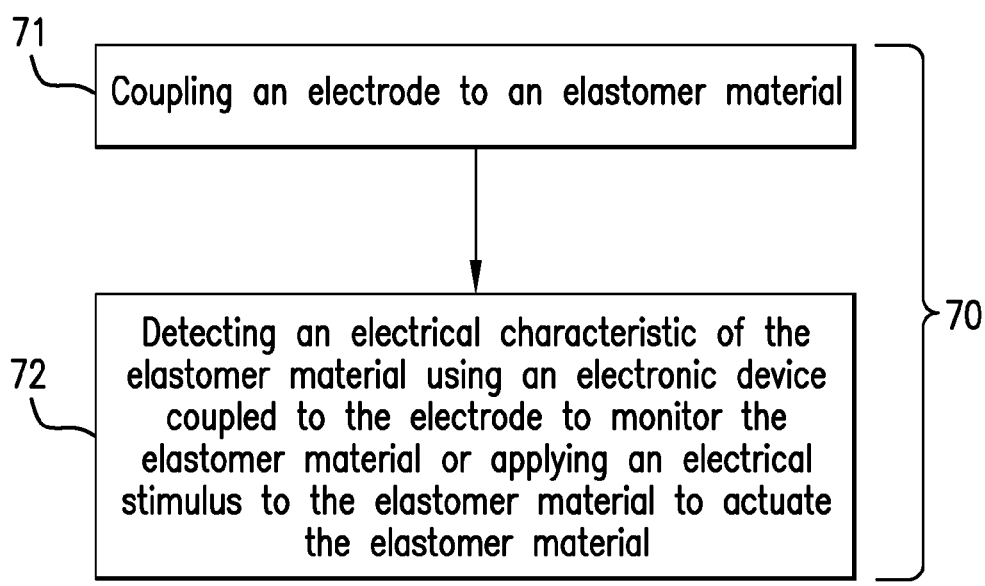
FIG. 7 presents one example of a method for monitoring or actuating the elastomer material.

FIG. 7 presents one example of a method 70 for monitoring the health of or actuating the elastomer material 7. The method 70 calls for (step 71) coupling the electrode 8 to the elastomer material 7. Further, the method 70 calls for (step 72) detecting an electrical characteristic of the elastomer material 7 using the electronic monitoring device 9 coupled to the electrode 8 to monitor the health of the elastomer material 7 or applying an electrical stimulus to the elastomer material 7 to actuate the elastomer material 7.

Figure 8:
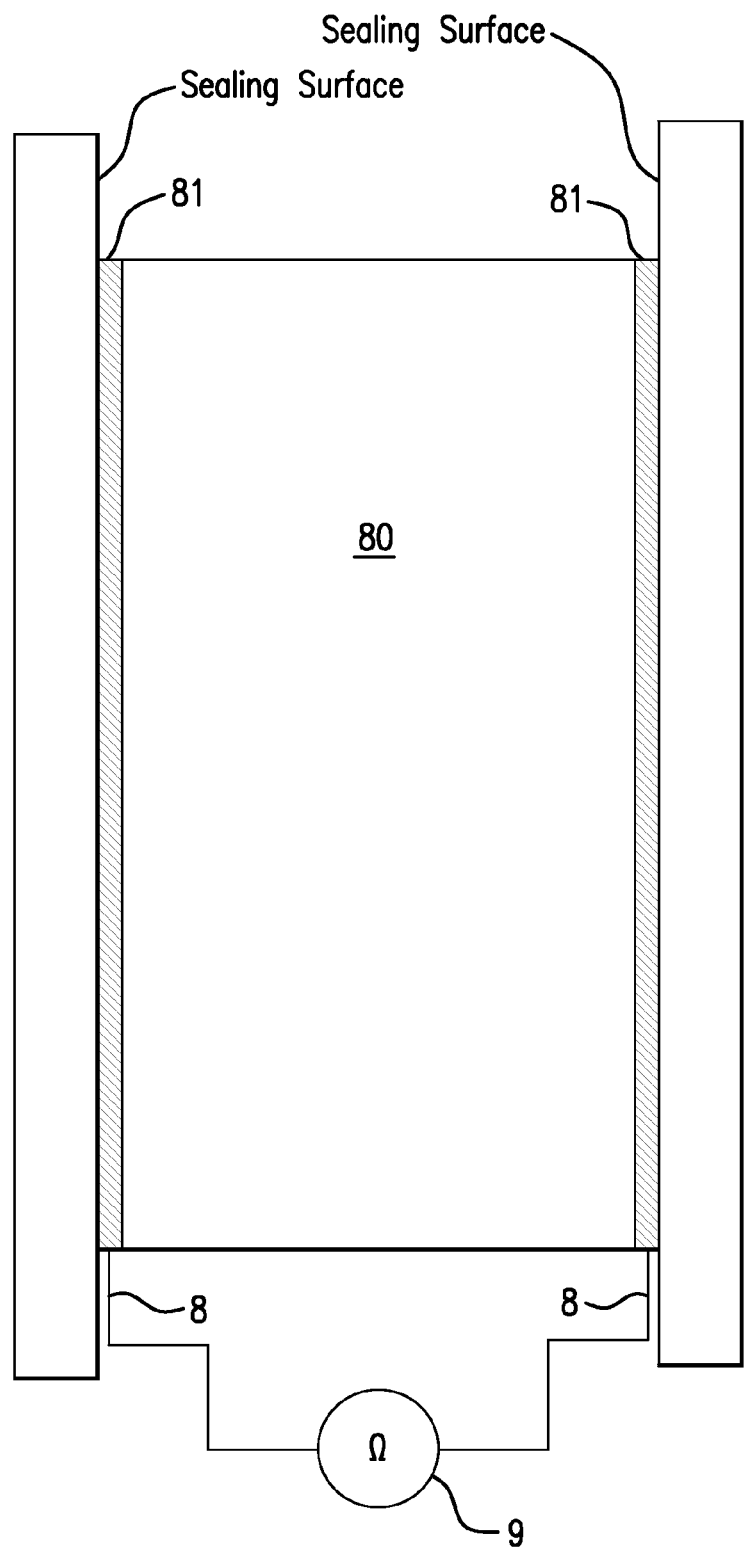
FIG. 8 depicts aspects of monitoring or actuating a metal used as a seal.

While the teachings above relate to monitoring or actuating the elastomer material 7, it can be appreciated that the teachings can also apply to other materials that can be electrically monitored or actuated. Examples of other materials that can be monitored include a glass, a ceramic, and a metal. Referring to FIG. 8, when a metal 80 is monitored, the metal generally requires one or more electrical insulating layers 81 in order to prevent leakage of electrical current from the metal 80 (i.e., prevent shorting out the metal 80 to a conductive sealing surface). In the embodiment of FIG. 8, the electrodes 8 are connected to the electrical insulating layers 81. In another embodiment, the electrodes 8 are connected to the metal 80.

In support of the teachings herein, various analysis components may be used, including a digital and/or an analog system. For example, the downhole electronics 5, the surface computer processing 6, or the electronic monitoring device 9 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottomhole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus comprising:
   an electrode configured to be coupled to a material disposed in a downhole tool configured to be conveyed in a borehole penetrating the earth, wherein the electrode is in contact with the material; and
   an electronic device coupled to the electrode and configured to detect an electrical characteristic of the material to monitor the material or to apply an electrical stimulus to the material to actuate the material directly from the applied electrical stimulus;
   wherein the electronic device is configured to receive an input related to an environment experienced by the material and to compensate for the environment in detecting a change in an electrical characteristic of the material.

2. The apparatus according to claim 1, wherein the electrical characteristic comprises at least one of resistivity, conductivity, capacitance, or a combination thereof.

3. The apparatus according to claim 1, wherein the physical characteristic is pressure experienced by the material.

4. The apparatus according to claim 1, wherein the electrode is coupled to a surface of the material.

5. The apparatus according to claim 1, wherein the electrode is imbedded in the material.

6. The apparatus according to claim 1, wherein the material comprises nanotubes configured to contribute to the electrical characteristic.

7. The apparatus according to claim 1, wherein the downhole tool is conveyed through the borehole by a carrier comprising at least one of a wireline, a slickline, a drillstring, and coiled tubing.

8. The apparatus according to claim 1, wherein the material is disposed in a stator of a positive displacement motor and the electronic device is configured to monitor wear of the stator.

9. The apparatus according to claim 1, wherein the electronic device is further configured to detect a change in the electrical characteristic to monitor the health of the material.

10. The apparatus according to claim 1, wherein the material is configured to seal or unseal against a surface upon receipt of the electrical stimulus.

11. The apparatus according to claim 1, wherein the material is an elastomer.

12. The apparatus according to claim 1, wherein the material is a glass.

13. The apparatus according to claim 1, wherein the material is a ceramic.

14. The apparatus according to claim 1, wherein the material is a metal comprising at least one electrical insulating layer configured to prevent electrical current leakage from the metal.

15. The apparatus according to claim 1, wherein the electrical characteristic is related to a physical characteristic of the material.

16. The apparatus according to claim 15, wherein the physical characteristic is shape.

17. The apparatus according to claim 1, wherein the electrode comprises a plurality of electrodes.

18. The apparatus according to claim 17, wherein the plurality of electrodes is spatially distributed along the material.

19. The apparatus according to claim 1, wherein the material comprises nanoparticles configured to contribute to the electrical characteristic.

20. The apparatus according to claim 19, wherein the nanoparticles comprise carbon black.

21. The apparatus according to claim 1, wherein the material is configured to contact a surface to form a seal.

22. The apparatus according to claim 21, wherein a change in an electrical characteristic of the material relates to a degradation of the seal.

23. A method for monitoring a material disposed in a downhole tool configured to be conveyed in a borehole penetrating the earth or actuating the material, the method comprising:
    coupling an electrode to the material, wherein the electrode is in contact with the material;
    detecting an electrical characteristic of the material using an electronic device coupled to the electrode to monitor the material or applying an electrical stimulus to the material using the electronic device and the electrode to actuate the material directly from the applied electrical stimulus;
    receiving an input related to an environment experienced by the material; and
    compensating for the environment in detecting a change in an electrical characteristic of the material.

24. The method according to claim 23, wherein the material is configured to contact a surface to form a seal in a downhole tool configured to be conveyed in a borehole penetrating the earth.

25. The method according to claim 23, wherein the environment is at least one of a pressure and a temperature.

26. The method according to claim 23, wherein applying the electrical stimulus results in the material applying a selected pressure profile.

27. The method according to claim 23, wherein the material is an elastomer.

28. The method according to claim 23, wherein the material is a glass.

29. The method according to claim 23, wherein the material is a ceramic.

30. The method according to claim 23, wherein the material is a metal comprising at least one electrical insulating layer configured to prevent electrical current leakage from the metal.

31. A non-transitory computer-readable medium comprising computer-executable instructions for monitoring a material disposed in a downhole tool configured to be conveyed in a borehole penetrating the earth or actuating the material by: detecting an electrical characteristic of the material using an electronic device coupled to an electrode that is coupled to and in contact with the material to monitor the material or by applying an electrical stimulus to the material using the electronic device and the electrode to actuate the material directly from the applied electrical stimulus receiving an input related to an environment experienced by the material; and compensating for the environment in detecting a change in an electrical characteristic of the material.

* * * * *